No. 872,468. PATENTED DEC. 3, 1907.
W. D. SMITH.
MACHINE FOR BRUSHING AND REVOLVING ORANGES AND OTHER FRUITS.
APPLICATION FILED OCT. 23, 1906.
3 SHEETS—SHEET 2.
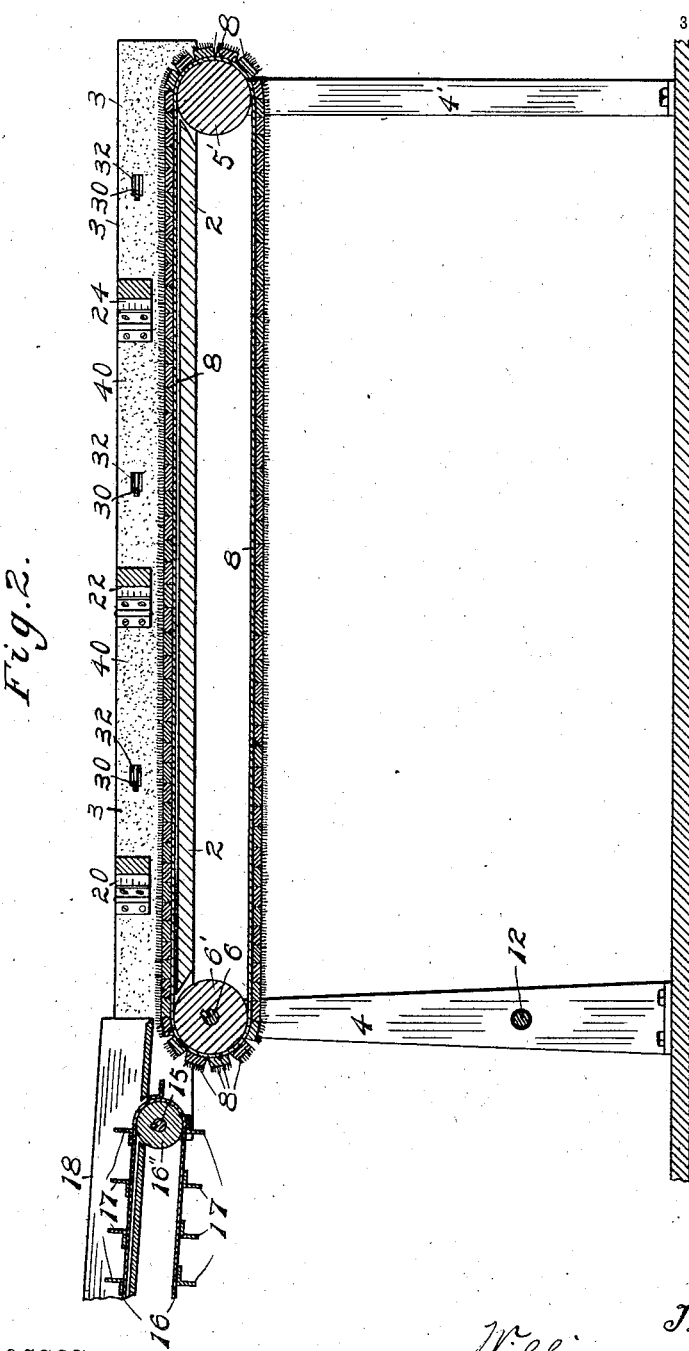
Witnesses:
H. H. Hunt.
E. M. Conlee
Inventor:
William D Smith
By James R. Rogers
Attorney.

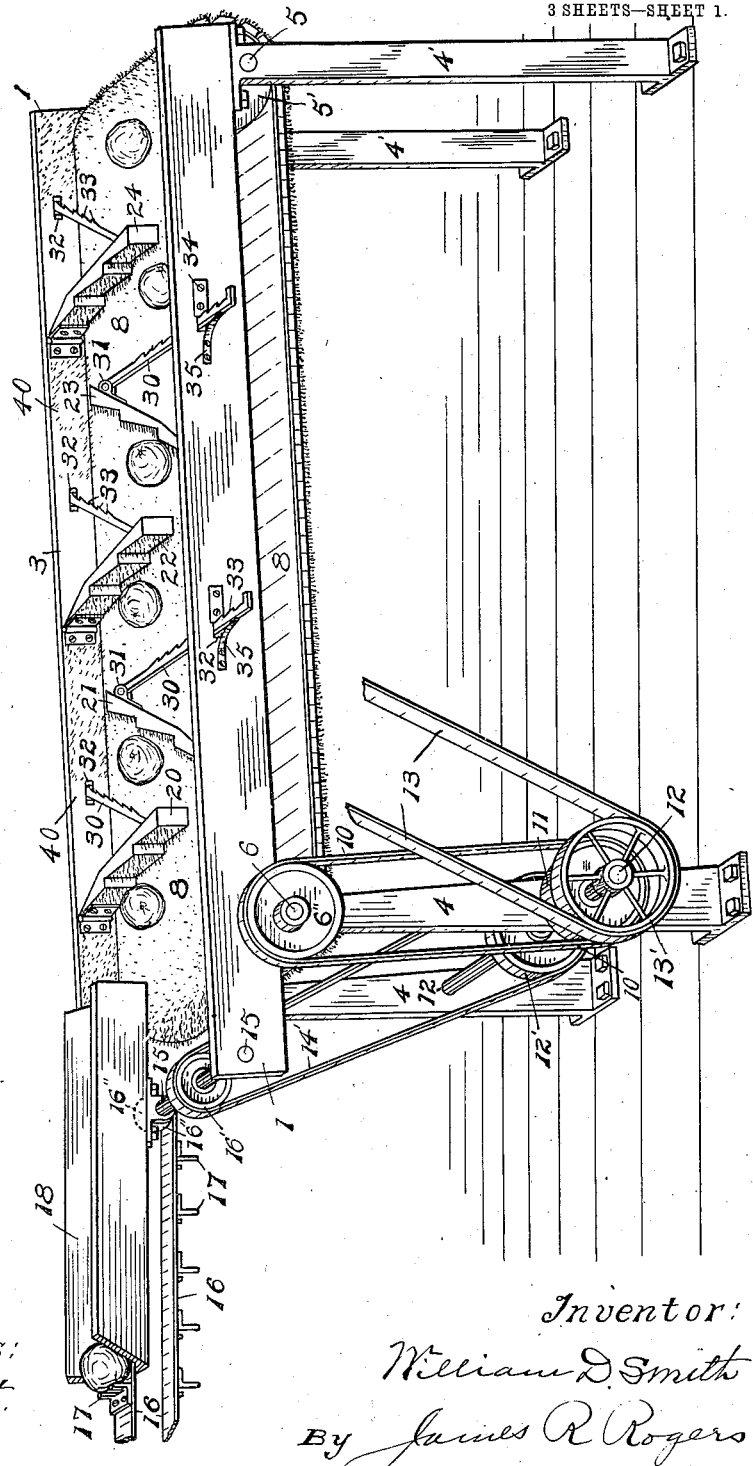

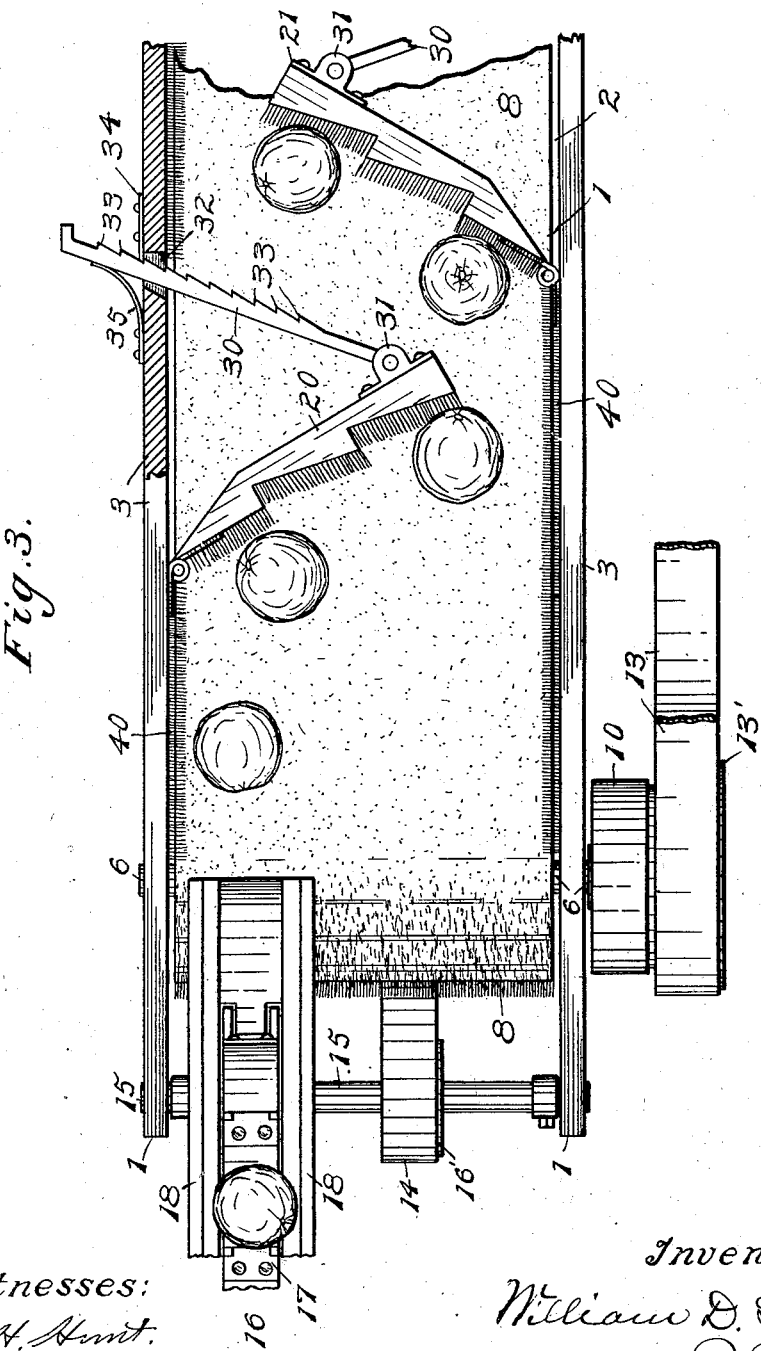

UNITED STATES PATENT OFFICE.

WILLIAM D. SMITH, OF FULLERTON, CALIFORNIA.

MACHINE FOR BRUSHING AND REVOLVING ORANGES AND OTHER FRUITS.

No. 872,468.  Specification of Letters Patent.  Patented Dec. 3, 1907.

Application filed October 23, 1906. Serial No. 340,205.

*To all whom it may concern:*

Be it known that I, WILLIAM D. SMITH, a citizen of the United States, residing at Fullerton, county of Orange, State of California, have invented and discovered a new and useful Improvement in Machines for Brushing and Revolving Oranges and other Fruits; and I do hereby declare the following to be a full, clear, and exact description of the invention, such as will enable others skilled in the art to which it appertains to make and use the same.

This invention relates to improvements in machines for brushing and revolving oranges and other fruits; and the objects of my improvements are; first, to provide means for separately feeding and separately brushing the fruit while passing through the machine; second, to afford facilities for revolving the oranges and other fruits, presenting all parts of the surface of the separately-fed fruits to the brushes while passing through the machine; and third, to combine in one apparatus means for singly feeding one orange or other fruit at a time to the brushes, and means for keeping separated one orange from another while passing through the machine, turning the fruit upon the short and long axis, and separately brushing the same, and causing the fruit to move more rapidly near the rear end of the machine than at the front end thereof.

This invention consists essentially in the construction, combination and arrangement of the several parts, as will be hereinafter fully described in the specifications shown upon the drawings appended hereto, and specifically pointed out in the claims made a part hereof.

I attain these objects by the construction and arrangement of the several parts illustrated upon the accompanying drawings in which,—

Figure 1. is a perspective view of my improved machine, parts thereof broken away; Fig. 2. is a longitudinal sectional view of the machine, portions thereof broken away; and Fig. 3. is a plan view of my machine, parts thereof broken away.

Similar reference numerals, and letters refer to like parts throughout the several views of the drawings.

The reference numeral 1, denotes the frame or trough of my machine, preferably made rectangular in shape, provided with a bottom 2, and two side pieces 3, the said trough 1 being desirably supported at the front end by the legs 4, and at the rear end thereof by the legs 4', as shown upon Fig. 1 of the drawings. In the upper ends of the legs 4', the shaft 5 is journaled, extending across the rear end of the machine, and preferably carries the drum-idler 5', of the length of the width of the trough 1, and revolves therein. In the upper ends of the front legs 4, extending from side to side of the frame is journaled the shaft 6, carrying the drum 6' of the width of the trough 1, adapted to revolve within the trough.

The endless brush-belt or carrier 8, passes over the drum-idler 5' at the rear end of the machine, and over the drum 6' at the front end of the machine, the said brush-belt or carrier 8, adapted to convey oranges or other fruits through the trough 1. The brush-belt 8 is driven by the endless belt 10, passing over the pulley 6" on the shaft 6, and over the pulley 11 upon the shaft 12. The said shaft 12 is driven by means of the main driving belt 13, passing over the pulley 13' on said shaft 12, and over a pulley not shown, upon an overhead power shaft, not necessary to be illustrated upon the drawings. Upon the said shaft 12, journaled in the lower portion of the said legs 4 of the machine, has secured thereon in any well-known manner the pulley 12', and upon the shaft 15, in the extended ends of the two side pieces of the trough or frame, is secured the pulley 16'. Over the said two pulleys, 12' and 16', the endless belt 14' is secured, as illustrated upon Fig. 1 of the drawings. Upon the said shaft 15 is also keyed or otherwise secured the pulley 16', over which the endless feed-belt 16, having secured thereon the separating-blocks 17, passes, and over a pulley upon the upper end of the feed-box 18, not necessary to be shown upon the drawings. The said endless belt is adapted to convey oranges or other fruits singly to and upon the endless brush-belt or carrier 8, which passes through the entire length of the trough 1. The oranges or other fruits, being separately delivered upon the said endless brush-belt 8, at the front end of the trough take up the fruit as it drops from the end of the hopper 18, swiftly carries the fruit against the first of the notched angle-arranged brushes 20, extending partially across the trough 1, to and around the free end thereof, and against the notched brush 21. The swiftly running endless brush-belt continues to carry the fruit in a zigzag line to the opposite side of the trough 1, around the free end of the notch-stepped and angularly-arranged brush 21, until free from the said brush 21. The fruit being free from the brush 21, is carried in the opposite direction to and around the free end of the notch-stepped brush 22, until the fruit has passed the entire length of the trough in a zigzag line to and around the brushes 23 and 24 respectively, which are hinged to the side pieces 3 of the trough, and provided with rack-braces 30, swiveled at 31 to the rear faces of the brushes at one end, the opposite end of the said rack-braces passing through slots 32, in the side pieces 3, of the trough 1, the teeth 33 of the rack-braces adapted to engage the stops 34, by means of springs 35, secured upon the outer faces of the said side pieces, near the slots 32.

I preferably arrange the notched-stepped brushes 20, 21, 22, 23 and 24 at different angles to the side pieces 3 of the trough, in order that as the fruit approaches the rear end of the trough, being clean and free from foreign matter, can be more rapidly delivered from the trough and will not accumulate at the delivery end of the trough and thereby clog the fruit in its passage through the machine.

The side pieces 3, of the trough, I preferably line with brushes 40, in order that the swiftly conveyed oranges or other fruit, when delivered from the free ends of the said angularly-arranged brushes, are brought in contact with the brushes 40, covering the inner surface of the side pieces 3 of the trough, are wiped free of any foreign material that may then be adhering to the fruit. The oranges or other fruit being rapidly whirled through the trough against the notched-stepped brushes and around the free ends thereof, carried in a zigzag line striking the inner brush-lined surfaces of the trough, are turned upon the short axes as well as the longer axes of the fruit, and thereby wiped and scrubbed of any foreign material desirable to be removed from the fruit while passing through the machine.

From the foregoing description, taken in connection with the drawings, it is thought that the construction, mode of operation, and advantages of the invention will be readily apparent without requiring further explanation.

I claim:

1. A combined feeding and brushing apparatus, comprising a feeding-belt having separating-blocks secured thereto, means for operating the feed-belt, in combination with a brush-lined trough and supports therefor, an endless carrier-belt having brushes secured thereto, means for operating the carrier-belt, a series of brushes arranged at angles to the feed-trough provided with steps or notches upon the faces thereof and means secured to the brushes and to the trough for supporting the angle-arranged brushes at different angles to the sides of the trough.

2. A fruit cleaning apparatus for separately feeding and singly brushing oranges and other fruits, comprising a feed-belt, carrying separating-blocks thereon in combination with a trough having brushes secured at an angle to the inner faces of the sides of the trough, a carrier-belt provided with brushes, means for operating the carrier-belt, a series of angle-arranged brushes, movably secured to the inner faces of the sides of the trough, and means secured to the brushes and to the trough for retaining the angle-arranged brushes at different angles to the sides of the trough.

3. A combined separately feeding brushing apparatus, comprising a feeding-belt provided with separating-blocks, a brush-lined trough and supports therefor, a brush-covered carrier-belt adapted to travel within the trough, means for operating the feeding-belt and the brush-covered carrier-belt, a series of brushes hinged to the sides of the trough, having steps or notches upon the brushing faces thereof and means secured to the brushes and sides of the trough for retaining the brushes at different angles to the inner faces of the sides of the trough.

4. A brushing trough for fruits, lined upon the inner faces of the sides thereof with brushes, a series of angle-arranged brushes, hinged to the inner surfaces of the sides of the trough having steps or notches upon the brushing faces thereof, rack-braces hinged to the brushes adapted to engage stops upon the sides of the trough, to retain the said angle-arranged brushes at different angles to the inner faces of the trough.

5. A brush-lined trough, having a series of slots in the sides thereof, a series of angle-arranged brushes swiveled to the inner faces of the sides of the trough at different angles thereto, rack-braces movably secured to the brushes at one end and the opposite end extending through the said slots in the sides of the trough, stops secured upon the sides of the trough, and springs fastened to the trough adapted to force the teeth of the rack-braces against the stops to hold the angle-arranged brushes at different angles to the sides of the trough.

6. A fruit cleaning machine comprising a brush-lined trough provided with slots in the sides thereof, a series of angle-arranged brushes hinged to the inner face of the sides of the trough having steps or notches upon the brushing faces thereof, the braces having teeth upon one edge and springs secured to the trough, movable in said slots, the opposite ends of the braces extending through the slots in the sides of the trough, stops secured to the trough adapted to engage the teeth upon the braces to retain the said angle-arranged brushes at different angles to the sides of the trough, and means for conveying the fruit through the trough.

In testimony whereof, I have signed my name to this specification in the presence of two subscribing witnesses.

WILLIAM D. SMITH.

Witnesses:
JAMES R. ROGERS,
E. M. CONLEE.